United States Patent [19]

Richards et al.

[11] Patent Number: 4,518,753

[45] Date of Patent: May 21, 1985

[54] ANIONIC POLYMERIZATION OF CONJUGATED DIENES IN THE PRESENCE OF HINDERED TRIARYL BORON OR ALUMINUM DERIVATIVES

[75] Inventors: David H. Richards, Waltham Abbey; Malcolm J. Stewart, Watford, both of England

[73] Assignee: The National Research and Development Corporation, London, England

[21] Appl. No.: 485,586

[22] Filed: Apr. 15, 1983

[30] Foreign Application Priority Data

Apr. 26, 1982 [GB] United Kingdom ............... 8212033

[51] Int. Cl.³ .............................................. C08F 4/52
[52] U.S. Cl. ................................. 526/177; 526/178; 526/335
[58] Field of Search ........................... 526/177, 178

[56] References Cited

U.S. PATENT DOCUMENTS

| | | | |
|---|---|---|---|
| 2,996,480 | 8/1961 | Sterling et al. | 526/196 |
| 3,112,298 | 11/1963 | Welch | 526/196 |
| 3,278,508 | 10/1966 | Kahle et al. | 526/177 |
| 3,526,604 | 9/1970 | Wadsworth | 526/177 |
| 3,972,863 | 8/1976 | Petrov et al. | 526/177 |
| 4,079,176 | 3/1978 | deZarauz | 526/177 |

OTHER PUBLICATIONS

Chem. Abstracts, vol. 86, entry 107110, Podolskii et al.

*Primary Examiner*—Joseph L. Schofer
*Assistant Examiner*—Peter F. Kulkosky
*Attorney, Agent, or Firm*—Stevens, Davis, Miller & Mosher

[57] ABSTRACT

A process for the anionic polymerization of a conjugated 1,3-diene in a polar solvent consists of contacting the 1,3-diene with an organo alkali or alkaline earth metal initiator and a sterically hindered Lewis acid, allowing the 1,3-diene to polymerize in the polar solvent and terminating the polymerization reaction. Preferably the Lewis acid is a substituted triaryl derivative of a Group III element, especially boron. However in certain cases (e.g. where the aryl derivative itself is large) the Lewis acid may be an unsubstituted triaryl derivative of a Group III element. Suitable Lewis acids include trimesityl boron and tri (2,6-dimethylphenyl) boron. In preferred embodiments of the present process the 1,3-diene is butadiene, the polar solvent is tetrahydrofuran and the initiator is a difunctional initiator, especially an electron transfer reagent. The main advantages of the present process are that polymers with enhanced 1,4-content, a narrow molecular weight distribution and, in the case of telechelic polymers, with an enhanced difunctional specificity are obtained.

21 Claims, No Drawings

ANIONIC POLYMERIZATION OF CONJUGATED DIENES IN THE PRESENCE OF HINDERED TRIARYL BORON OR ALUMINUM DERIVATIVES

The present invention relates to a process for the anionic polymerisation of conjugated 1,3-dienes in a polar solvent and, in particular, to such a process when initiated by a difunctional initiator.

Highly useful polymeric products can be obtained by polymerising olefinic containing monomers in the presence of an organo-alkali metal initiator and subsequently reacting the resulting polymer, containing an active alkali metal end group or groups, with a reagent which, will either couple the polymer molecules or replace the alkali metal with more stable reactive end groups.

It can be seen that such a polymerisation process will consist essentially of three stages:
(a) Initiation, in which the monomeric material is contacted with a monofunctional or difunctional anionic initiator,
(b) Propagation, in which the monomer is allowed to polymerise to form living polymer chains with negatively charged ends, and
(c) Termination, in which the living polymer chains are treated with suitable reagents, generally to form monofunctionally or difunctionally terminated polymers.

The presence of a reactive terminal group or groups on the ends of the polymer molecules enables substantially more effective cures to take place. In the case of a polymer containing a reactive group on each of its ends (a telechelic polymer) all of the polymer molecule will be tied into the cross-linked structure of the cured material. The well defined structure produced by telechelic polymers in the networks of their cured products is the primary reason for their increased use as precursors in the commercial production of cured rubbery solids.

However, in order to meet the requirements of a modern synthetic rubber it is not enough that the polydiene precursor produces effective cures nor that the cured product has a well defined cross linked structure, it is also important that the cured product possesses good elastomeric properties. In the case of polydienes the elastomeric quality of the cured product is dependent upon the 1,4-content of the polymeric diene. Generally, the higher the 1,4-content of the polymer, the better the elastomeric properties of the cured product. It follows from this that any process chosen for the commercial production of polydienes (in particular telechelic polymers of 1,3-dienes) must lead to a material having a high 1,4-content.

It is well established that high 1,4-monofunctional polydienes an be prepared in inert hydrocarbon solvents by initiating the reaction with a monofunctional initiator such as butyl lithium. As yet it has not been possible to use these conditions in the preparation of telechelic polydienes since difunctional initiators are generally insoluble in non polar solvents such as hydrocarbons.

A possible alternative to the above reaction scheme would be to replace the hydrocarbon by a polar solvent, such as ether or tetrahydrofuran, in which the difunctional initiator is soluble. Unfortunately the effect of such polar solvents on the anionic polymerisation of 1,3-dienes, whether initiated by mono- or difunctional initiators, is already well established, the material produced having a very low 1,4-content (ca.10%) and inferior elastomeric properties after cross linking.

At present, therefore, telechelic polymers of 1,3-dienes are prepared by a free radical process, in which initiation is effected by a functional radical, rather than by an anionic process. An example of this free radical polymerisation is the production of hydroxy terminated polybutadiene (HTPB) by the action of hydrogen peroxide and ferrous iron on butadiene. Although the materials prepared by this free radical technique possess the required high 1,4-structure (ca.80%), they have also been found to suffer from two major disadvantages. These are that the materials are not uniquely difunctional and that they have a broad molecular weight distribution.

In principal both of these disadvantages could be overcome by preparing the monofunctional or telechelic polymers by an anionic polymerisation in a polar solvent. As we have seen however the use of these conditions has previously been inhibited by the very low 1,4-content of the material produced.

It is the main object of the present invention to provide a process for the anionic polymerisation of a conjugated 1,3-diene in a polar solvent which produces a polymeric material having a narrow molecular weight distribution, an enhanced 1,4-content and, in the case of telechelic polymers, an enhanced difunctional specificity. Other objects and advantages of the present invention will become apparent from the following description thereof.

According to the present invention there is provided a process for the anionic polymerisation of a conjugated 1,3-diene in a polar solvent comprising contacting the conjugated 1,3-diene with an organo alkali or alkaline earth metal initiator in the presence of a sterically hindered Lewis acid.

The Lewis acid of the present invention must be sterically hindered. In other words it will preferably be chosen from those organometallic acids that are inaccessible to attack by the electron rich propagating anion, that is those acids whose rate of reaction with the propagating anion, to form a stable Lewis acid salt, ranges from very slow (relative to the rate of propagation) to zero. Preferably the Lewis acid will be a substituted triaryl derivative of a Group III element although in certain cases, where the aryl derivative itself is large the Lewis acid may be an unsubstituted triaryl derivative of a Group III element. Preferably the Group III element is either boron or aluminium, with boron being particularly preferred. Examples of Lewis acids suitable for use in the present process are trimesityl boron (tri(2,4,6-trimethylphenyl)boron) and tri(2,6-dimethylphenyl)boron. An example of a Lewis acid that is unsuitable for use, its metal atom being insufficiently sterically hindered, is triphenyl boron. In this latter case the addition of the Lewis acid (triphenyl boron) almost immediately terminates the polymerisation of the diene with the formation of the stable polydiene triphenyl boron adduct.

The conjugated 1,3-dienes of the present invention will preferably contain from 4 to 12, especially from 4 to 8, carbon atoms per molecle. Examples of these compounds include the following: 1,3-butadiene; isoprene; 2,3-dimethyl-1,3-butadiene; 1,3-pentadiene; 2-methyl-3-ethyl-1,3-butadiene; 3-methyl-1,3-butadiene; 2-methyl-3-ethyl-1,3-pentadiene; 2-ethyl-1,3-pentadiene; 1,3-hexadiene; 2-methyl-1,3-hexadiene, 1,3-heptadiene; 3-methyl-1,3-heptadiene; 1,3-octadiene; 3-butyl-1,3-octadiene;

3,4-dimethyl-1,3-hexadiene; 3-n-propyl-1,3-pentadiene; 4,5-diethyl-1,3-octadiene; phenyl-1,3-butadiene; 2,3-diethyl-1,3-butadiene; 2,3-di-n-propyl-1,3-butadiene and 2-methyl-3-isopropyl-1,3-butadiene. Among the dialkylbutadienes, it is preferred that the alkyl groups contain from 1 to 3 carbon atoms. Of the above monomers 1,3-butadiene, isoprene, 2,3-dimethyl-1,3-butadiene and 1,3-pentadiene are preferred, with 1,3-butadiene being particularly preferred. The conjugated dienes may be polymerised alone, or in admixture with each other to form copolymers or by charging the dienes sequentially to form block copolymers.

The organo alkali or alkaline earth metal initiator may be either a mono- or, which is preferred, a difunctional initiator of anionic polymerisation reactions, depending upon whether a monofunctionally terminated or a telechelic polymer is required. Preferably the initiator is either an alkyl or an aryl salt of either lithium or sodium. Examples of suitable monofunctional initiators are monoalkyl lithium salts such as n-butyl and sec-butyl lithium. Examples of suitable difunctional initiators are aryl or aralkyl sodium compounds such as the disodium tetramer of α-methylstyrene ($\alpha 4Na_2$) and the electron transfer reagent sodium naphthalene (NaN) and alkyl lithium compounds such as 1,4-dilithiobutane.

The polar solvent will be an organic solvent that meets the following criteria:
(a) dissolves both monofunctional and difunctional anionic initiators,
(b) acts as a good solvating solvent, and
(c) does not terminate the anionic polymerisation reaction.

Generally the alkyl or cycloalkyl ethers, such as diethyl ether, diisopropyl ether and, especially, tetrahydrofuran, are preferred, although nitrogen containing solvents, such as tetramethyl ethylene diamine, may also be useful.

The present polymerisation process may be initiated either before or after the Lewis acid has been added to the bulk of the conjugated 1,3-diene. For example the polymerization of 1,3-butadiene may be effected in the manner of this invention by this consecutive addition of sodium naphthalene and trimesityl boron to the monomer containing solution. Alternatively the polymerisation may be effected by first splitting the diene into a major and a minor component, then adding trimesityl boron to the major component and sodium naphthalene to the minor component and finally mixing the two components together. It can be seen that in the first case the reaction is initiated before the addition of the Lewis acid, whilst in the second case initiation takes place after the Lewis acid has been added to the bulk of the monomer. Other variations in the manner of initiating the present process will be apparent to those skilled in the art. It should be noted, for the avoidance of doubt, that the phrase "contacting the 1,3-diene with the organo alkali or alkaline earth metal initiator in the presence of a sterically hindered Lewis acid", when used in the present specification, incorporates all such variations in the manner of initiation.

After propagation has ceased, the active centre or centres on the living polymer chains may be terminated, by the addition of suitable reagents which either donate a proton to or functionalise the anionic carbons. Proton donors such as water or alcohol yield terminally non-functional polydienes. Preferably, however, the polymer chains will be terminated by one or, which is particularly preferred, two functional groups. Examples of suitable end groups are:
(a) carboxyl, prepared by adding $CO_2$ to the anionic polymer,
(b) hydroxyl, prepared by adding aldehydes, ketones or alkylene oxides, especially ethylene oxide,
(c) mercapto prepared by adding sulphur, cyclic disulphides or cyclic sulphides such as ethylene or propylene sulphides,
(d) amino and aziridine, prepared by adding aminoaldehydes or polyaziridines such as phenyl-bis(2-methyl-1-aziridinyl)phosphine oxide, and
(e) epoxide, prepared by adding glycidaldehyde or diepoxides.

The present polymerisation reaction is preferably carried out at a temperature in the range between 0° and 100° C., especially between 20° and 80° C. The maximum temperature that may be employed in a given system will depend primarily on the solvent chosen, for example in THF the maximum temperature is 66° C. Generally, temperatures towards the upper end of these ranges are preferred since, in most cases, the 1,4-content of the polydiene increases as the temperature increases.

The amount of initiator added to the reaction mixture will be determined by the structure of the monomer to be polymerised and by the desired molecular weight of the polymer. Typically, for the production of liquid polymers, between about 10 and 50 mmoles, especially 15 and 35 mmoles of initiator is used for each mole of monomeric diene.

By contrast the amount of Lewis acid added to the reaction mixture is determined by the level of 1,4-polymerisation that is required. The present inventors have found that the higher the molar ratio of Lewis acid to initiator the higher the 1,4-content of the polymer produced. Thus, although a molar ratio (Lewis acid to initiator) of about 1 to 1 may be useful for some purposes, a molar ratio of between 2 to 1 and 10 to 1 is generally preferred.

Preferably the terminally reactive polymers produced by the present process are liquids having an average molecular weight in the range of 2000 to 10000, especially 3000 to 7000. If desired however semi-solid and solid polymers having an average molecular weight of 100,000 or above may also be prepared.

The present polymerisation process offers a number of significant advantages over its competitors. First the molecular weight distribution (Mw/Mn) is narrower than that achieved by the analogous free radical process. In the present case the molecular weight distribution is generally about 1.3 or less whilst in the competing process Mw/Mn is generally 1.5 or above. The advantage offered by a polymer with a narrow Mw/Mn is that it produces a cured product with a well defined network and, as a consequence, high strength.

Although the present process produces a polymer with a narrow molecular weight distribution its use is not limited to the production of such polymers. Simply by mixing batches of the present polymers, each batch having a different molecular weight range, a polymeric mixture with a broad molecular weight distribution may be produced. Thus, unlike its competitors, the present process may be employed to produce polymeric materials with either a narrow or a broad molecular weight distribution.

The second advantage offered by the present process is the enhancement of the 1,4-content of a polydiene when such a material is produced in a polar solvent by anionic polymerisation. The degree of enhancement will be determined not only by the choice of the Lewis acid but also by other reaction conditions such as the reaction temperature, the molar ratio of Lewis acid to initiator and the choice of initiator. For example, when the polymerisation of butadiene, initiated by $\alpha_4Na_2$, is conducted in tetrahydrofuran in the absence of a Lewis acid, the 1,4 content of the polymer obtained is about 13%. The addition of trimesityl boron to the above reaction mixture, in a 1 to 1 and 3 to 1 molar ratio of acid to initiator, increases the 1,4 content of the product to, respectively, 25 and 51%.

The third advantage of the present invention is the enhanced difunctional specificity of the telechelic polymers produced therein (compared to those produced by free radical processes). In order to lead to a cured solid with a well defined network (and high strength) a telechelic polymer should consist predominantly of polymer molecules that are only functionalised at their chain ends. This terminal functionalisation minimises the number of free chain ends that are present in the cured product and is primarily responsible for the favourable polymer network structure obtained. It is well established that the free radical polymerisation of conjugated 1,3-dienes in hydrocarbon solvent can often lead to a material that exhibits a significant amount of branching (with a consequent molar functionality of greater than 2). By contrast the present inventors have found that the polymeric materials formed in the present process have virtually no branching (and a consequent molar functionality of close to 2).

A further advantage of the present invention lies in the polarity of the solvent and the type of initiator that may, as a consequence, be used to initiate the reaction. In particular the use of a polar solvent allows electron transfer agents, such as sodium napthalene, and low molecular weight organo alkali metal compounds, such as 1,4-dilithiobutane to be employed as difunctional initiators in the present process. It is a feature of these initiators that they do not significantly affect the properties of the polydiene produced in the polymerisation reaction even if that polydiene is of low molecular weight (less than 5000).

The process of the present invention will now be described by way of example only.

MATERIALS

Butadiene (Air Products) was dried by passing the monomer over molecular sieves and collected in a graduated vessel at −78° C. Trimesityl boron (TMB, Alfa) was recrystallised from a benzene/methanol mixture, dried and stored under vacuum until use. Tris(2,6-dimethylphenyl)borane was prepared using the method of Brown etal, JACS, 1957, 79, 2302.

n-Butyl lithium (Aldrich) was supplied and used as a 1.6M solution in hexane.

Naphthalene (BDH, molecular weight determination grade) was used as supplied.

α-Methylstyrene (BDH) was dried over calcium hydride, then redistilled under reduced pressure and the middle fraction collected (bp 26° C. at 1 mm Hg).

Sodium metal (BDH), supplied as pellets under paraffin oil, was washed in 60–80 petroleum ether and pressed into 2 mm diameter wire for use.

Sodium naphthalene (NaN) was prepared by the process of Burgess, MSc. Thesis, Univ of St Andrews, 1976.

The disodium tetramer of α-methylstyrene ($\alpha_4Na_2$) was prepared by the process of Richards etal, Chem Commun, 1967, 414 or J Poly Sci Poly Chem Ed, 1973, 11, 80.

Tetrahydrofuran (BDH), stabilised with 0.1% quinol, was distilled under nitrogen when required after sufficient 0.7M sodium naphthalene solution in THF had been added to yield a permanent green colour.

GENERAL PROCEDURE

Reactions were carried out in a nitrogen atmosphere. Conventional quickfit glassware was used which was subjected to the following cleansing procedure:

It was heated to 500° C. overnight in a muffle furnace, cooled to room temperature and then washed in chromic acid, water (twice) and acetone. It was then dried in an oven at 80° C. until required.

Reagents were introduced as solutions by syringe through Subaseal serum caps (Gallenkamp). The syringes had been previously subjected to the cleansing procedure described above.

EXAMPLE 1

Molar ratio of Lewis acid to initiator, 1 to 1

A 500 ml. round bottomed 3 necked flask equipped with a magnetic follower, serum cap, bubbler for butadiene and a nitrogen inlet/outlet was used as the reaction vessel. Tetrahydrofuran (200 ml.) together with butadiene (10 ml out of 80 ml stored in an attached graduated flask) was introduced to the vessel. Butyl lithium (0.016M) was then injected and the monomer in solution was allowed to polymerise for 5 min. After this time a reference sample was removed from the vessel and terminated by the addition of methanol. A solution of trimesityl boron (0.016M) in THF (10 ml) was then added to the reaction mixture and this was followed by the remaining butadiene. The polymerisation reaction was allowed to proceed at 20° C. for 30 min before being terminated by the addition of methanol.

It was noted that the colour of the solution changed on addition of TMB from the yellow characteristic of the polybutadienyl anion to purple, and that the intensity of this coloration increased as the reaction proceeded.

The sample and reference solutions were then reduced in volume by rotary evaporation and the polymers were precipitated by the addition of ethanol and dried.

The molecular weights and the percentage 1,4-structure of both the sample and the reference were determined by Gel Permeation Chromatography (gpc) in which measurements were carried out on a Dupont Series 870 chromatograph fitted with refractive index and uv detectors. Four styrogel columns (Polymer Laboratories) of porosity $10^5$ Å, $10^4$ Å, $10^3$ Å and $10^2$ Å were used, and the molecular weights were determined from retention times as polystyrene equivalents, and 1H Nuclear Magnetic Resonance (nmr) Spectography in which measurements were carried out on either Varian Associates EM 60 MHz spectrometer or a Jeol PS 100 MHz spectrometer. Polymer samples were also analysed on a Jeol FX 90 φ 90 MHz Fourier Transform multiprobe spectrometer. Results are given in Table 1.

EXAMPLE 2

The procedure of Example 1 was repeated except that the reaction was terminated with ethylene oxide rather than methanol. The usual work up procedure produced a hydroxy terminated polybutadiene.

EXAMPLE 3

The procedure of Example 1 was repeated except that the reaction was terminated by contacting the living polymer with carbon dioxide. The usual work up procedure produced a carboxy terminated polybutadiene.

EXAMPLE 4

The procedure of Example 1 was followed except that the whole sample of butadiene was added to the reaction mixture prior to the addition of trimesityl boron.

EXAMPLE 5

Molar ratio of Lewis acid to initiator, 2 to 1

The procedure of Example 1 was followed except that the amount of trimesityl boron added was increased to 0.032M.

The 1,4 content of the resultant polymer is given in Table 1.

EXAMPLE 6

Molar ratio of Lewis acid to initiator, 3 to 1

The procedure of Example 1 was followed except that the amount of trimesityl boron added was increased to 0.048M.

The 1,4-content of the resultant polymer is given in Table 1.

EXAMPLES 7-9

The procedure of Examples 1-3 were followed, to produce hydrogen-, hydroxy- and carboxy-terminated polybutadienes, except that $\alpha_4Na_2$ (0.008M) replaced butyl lithium as the initiator.

The 1,4-content of the resultant hydrogen-terminated polybutadiene is given in Table 1.

EXAMPLES 10 AND 11

The procedures of Examples 5 and 6 were followed except that $\alpha_4Na_2$ (0.008M) replaced butyl lithium as the initiator.

The 1,4-content of the resultant polymers is given in Table 1.

EXAMPLES 12-14

The procedures of Examples 1-3 were followed, to produce hydrogen-, hydroxy- and carboxy-terminated polybutadienes, except that sodium naphthalene (0.008M) replaced butyl lithium as the initiator.

The 1,4-content of the resultant hydrogen terminated polymer is given in Table 1.

EXAMPLES 15 AND 16

The procedures of Examples 5 and 6 were followed except that sodium naphthalene (0.008M) replaced butyl lithium as the initiator.

The 1,4-content of the resultant polymers is given in Table 1.

TABLE 1

The effect of trimesityl boron on the structure of polybutadiene formed in an anionically initiated polymerisation in THF at 20° C.

| Example | Initiator | Molar Ratio of Lewis Acid to Initiator | 1,4-Content of Polybutadiene (%) |
|---|---|---|---|
| Control | Bu Li | — | 9 |
| 1 | Bu Li | 1 to 1 | 20 |
| 5 | Bu Li | 2 to 1 | 25 |
| 6 | Bu Li | 3 to 1 | 29 |
| Control | $\alpha_4Na_2$ | — | 13 |
| 7 | $\alpha_4Na_2$ | 1 to 1 | 25 |
| 10 | $\alpha_4Na_2$ | 2 to 1 | 42 |
| 11 | $\alpha_4Na_2$ | 3 to 1 | 51 |
| Control | NaN | — | 10 |
| 12 | NaN | 1 to 1 | 29 |
| 15 | NaN | 2 to 1 | 39 |
| 16 | NaN | 3 to 1 | 47 |

EXAMPLES 17-19

The procedure of Example 5 was repeated except that the polymerisation was conducted at the following temperatures, −25°, 0° and 45° C., rather than at 20° C.

The 1,4-content of the resultant polymers is given in Table 2.

TABLE 2

The effect of temperature on the structure of polybutadiene formed in a BuLi initiated polymerisation in THF in the presence of trimesityl boron (molar ratio TMB to BuLi, 2 to 1)

| Example | Temperature (°C.) | 1,4-Content of Polybutadiene (%) |
|---|---|---|
| 17 | −25 | 13 |
| 18 | 0 | 21 |
| 5 | 20 | 25 |
| 19 | 45 | 32 |

EXAMPLE 20

The procedure of Example 1 was followed except that tris(2,6-dimethyl phenyl)boron (0.016M) replaced trimesityl boron as the Lewis acid and the reaction temperature was decreased to −5° C.

The 1,4-content of the resultant polymer is given in Table 3.

EXAMPLE 21

The procedure of Example 20 was followed except that the amount of tris(2,6-dimethylphenyl)boron was increased to 0.032M.

The 1,4-content of the resultant polymer is given in Table 3.

EXAMPLES 22 AND 23

The procedures of Examples 20 and 21 were followed except that the reaction temperature was increased to 25° C.

The 1,4-content of the resultant polymer is given in Table 3.

EXAMPLE 24

The procedure of Example 20 was followed except that the amount of tris(2,6-dimethylphenyl)boron was increased to 0.048M and the reaction temperature was increased to 25° C.

The 1,4-content of the resultant polymer is given in Table 3.

TABLE 3

The effect of tris (2,6-dimethyl phenyl) boron on the structure of polybutadiene in an anionically initiated polymerisation in THF.

| Example | Temperature (°C.) | Molar Ratio of Lewis Acid to Initiator | 1,4-Content of Polybutadiene (%) |
|---|---|---|---|
| Control | −5 | — | 17 |
| 20 | −5 | 1 to 1 | 21 |
| 21 | −5 | 2 to 1 | 25 |
| Control | 25 | — | 13 |
| 22 | 25 | 1 to 1 | 22 |
| 23 | 25 | 2 to 1 | 33 |
| 24 | 25 | 3 to 1 | 44 |

EXAMPLES 25 AND 26

The procedures of Examples 7 and 10 were followed except that isoprene replaced butadiene as the 1,3-diene and the reaction was conducted at 0° C.

The 1,4-content of the resultant polymer is given in Table 4.

TABLE 4

The effect of trimesityl boron on the structure of polyisoprene formed in an anionically initiated polymerisation in THF at 0° C.

| Example | Initiator | Molar Ratio of Lewis Acid to Initiator | 1,4-Content of Polyisoprene (%) |
|---|---|---|---|
| Control | $\alpha_4 Na_2$ | — | 8 |
| 25 | $\alpha_4 Na_2$ | 1 to 1 | 18 |
| 26 | $\alpha_4 Na_2$ | 2 to 1 | 24 |

What I claim is:

1. A process for the production of a diene polymer having a relatively narrow molecular weight range by the anionic polymerisation of a conjugated 1,3-diene in a polar solvent wherein the 1,4-content of the polymer is enhanced and is at least about 20%, comprising:

(a) contacting the 1,3-diene with an organo alkali or alkaline earth metal initiator in the presence of a sterically hindered triaryl derivative of a group III element which is boron or aluminum, (b) allowing the 1,3-diene to polymerise in a polymerisation reaction in the polar solvent, and (c) terminating the polymerisation reaction.

2. A process according to claim 1 wherein the Group III element is boron.

3. A process according to claim 2 wherein the triaryl derivative comprises a triaryl boron derivative selected from the group consisting of tri(2,4,6-trimethylphenyl)boron and tri(2,6-dimethylphenyl)boron.

4. A process according to claim 1 where the Group III element is aluminium.

5. A process according to claim 1 wherein the conjugated 1,3-diene contains from 4 to 12 carbon atoms per molecule.

6. A process according to claim 5 wherein the conjugated 1,3-diene contains from 4 to 8 atoms per molecule.

7. A process according to claim 6 wherein the conjugated 1,3-diene comprises 1,3-butadiene.

8. A process according to claim 6 wherein the conjugated diene comprises a diene selected from the group consisting of isoprene, 2,3-dimethyl-1,3-butadiene and 1,3-pentadiene.

9. A process according to claim 1 wherein the organo alkali or alkaline earth metal initiator is a difunctional initiator.

10. A process according to claim 9 wherein the organo alkali or alkaline earth metal initiator comprises a reagent selected from the group consisting of alkyl lithium, alkyl sodium and aryl sodium.

11. A process according to claim 10 wherein the organo alkali or alkaline earth metal initiator is selected from the group consisting of the disodium tetramer of α-methylstyrene, sodium naphthalene and 1,4-dilithiobutane.

12. A process according to claim 1 wherein the polar solvent comprises a solvent selected from the group consisting of an alkyl ether and a cycloalkyl ether.

13. A process according to claim 12 wherein the solvent comprises tetrahydrofuran.

14. A process according to claim 12 wherein the polar solvent comprises a solvent selected from the group consisting of diethyl ether and diisopropyl ether.

15. A process according to claim 1 wherein the molar ratio of initiator to diene is between 15 to 1000 and 35 to 1000.

16. A process according to claim 1 wherein the molar ratio of triaryl derivative to initiator is between 2 to 1 and 10 to 1.

17. A process according to claim 1 wherein the polymerisation reaction is terminated by adding a proton donor or a functionalising reagent to the reaction mixture.

18. A process according to claim 17 wherein the proton donor is selected from the group consisting of water and alkyl alcohol.

19. A process according to claim 17 wherein the functionalising reagent is selected from the group consisting of carbon dioxide, an aldehyde, a ketone, an alkylene oxide, sulphur, a cyclic disulphide, a cyclic sulphide, an aminoaldehyde, a polyaziridine, a diepoxide and a glycidaldehyde.

20. A novel polymer whenever produced by a process according to claim 1.

21. A novel telechelic polymer whenever produced by a process according to claim 1.

* * * * *